US012525904B2

(12) United States Patent
Engler et al.

(10) Patent No.: US 12,525,904 B2
(45) Date of Patent: Jan. 13, 2026

(54) ELECTRIC DRIVE UNIT FOR A HAND-HELD POWER TOOL

(71) Applicant: Hilti Aktiengesellschaft, Schaan (LI)

(72) Inventors: Torsten Engler, Herrsching (DE); Michael Herzig, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 147 days.

(21) Appl. No.: 18/558,450

(22) PCT Filed: May 23, 2022

(86) PCT No.: PCT/EP2022/063846
§ 371 (c)(1),
(2) Date: Nov. 1, 2023

(87) PCT Pub. No.: WO2022/248383
PCT Pub. Date: Dec. 1, 2022

(65) Prior Publication Data
US 2024/0235438 A1     Jul. 11, 2024

(30) Foreign Application Priority Data

May 27, 2021   (EP) ..................................... 21176289

(51) Int. Cl.
*H02P 6/17*   (2016.01)
*B25F 5/00*   (2006.01)
*H02P 23/14*  (2006.01)

(52) U.S. Cl.
CPC .............. *H02P 6/17* (2016.02); *H02P 23/14* (2013.01); *B25F 5/00* (2013.01)

(58) Field of Classification Search
CPC ........ H02P 6/17; H02P 23/14; H02P 23/0077; B25F 5/00
(Continued)

(56) References Cited

U.S. PATENT DOCUMENTS 6,046,561 A  * 4/2000 Zup .................... H02P 25/0925
                                              318/254.1
6,496,786 B1  12/2002 Dieterle et al.
(Continued)

FOREIGN PATENT DOCUMENTS

DE     19845626 A1    4/2000
EP      1087232 A1    3/2001
KR   20160007780 A    1/2016

OTHER PUBLICATIONS

Jorge Zambada: "Sinusoidal Control of PMSM Motors with dsPIC3OF DSC", Oct. 31, 2005 (Oct. 31, 2005), XP055507372, from the internet: URL:http://ww1.microchip.com/downloads/en/AppNotes/01017A.pdf.

*Primary Examiner* — David Luo
(74) *Attorney, Agent, or Firm* — Davidson Kappel LLC

(57) ABSTRACT

Electric drive unit with a brushless DC motor and with a switching bridge for sensor-controlled commutation of the DC motor by at least one Hall sensor included in the DC motor, the Hall sensor being connected to the switching bridge and set up to detect an angle of rotation of the DC motor, and the drive unit also having a control unit, which is connected to the switching bridge and by which a setpoint speed for the DC motor can be specified, the control unit being set up to process Hall interrupts that are dependent on the angle of rotation and are caused by the at least one Hall sensor, and to determine an actual speed of the DC motor on the basis of time interrupts that are independent of the angle of rotation and the Hall interrupts that are dependent on the angle of rotation.

12 Claims, 4 Drawing Sheets

(58) Field of Classification Search
USPC .................. 318/400.38, 400.37, 400.01, 700
See application file for complete search history.

(56) References Cited

U.S. PATENT DOCUMENTS

| | | | | |
|---|---|---|---|---|
| 7,230,400 B1* | 6/2007 | Dufner | ...................... | H02P 6/18 |
| | | | | 318/400.14 |
| 8,368,331 B2* | 2/2013 | Brattoli | ..................... | H02P 6/28 |
| | | | | 318/400.04 |
| 9,246,416 B2* | 1/2016 | Ichikawa | .................. | H02P 3/06 |
| 10,615,733 B2* | 4/2020 | Cox | .................... | H01M 50/597 |
| 2004/0081438 A1 | 4/2004 | Hahn et al. | | |
| 2018/0367070 A1 | 12/2018 | Ichikawa et al. | | |

* cited by examiner

ELECTRIC DRIVE UNIT FOR A HAND-HELD POWER TOOL

The present invention relates to an electric drive unit with a brushless DC motor and with a switching bridge for sensor-controlled commutation of the DC motor by means of at least one Hall sensor included in the DC motor, the Hall sensor being connected to the switching bridge and set up to detect an angle of rotation of the DC motor. The drive unit also has a control unit, which is connected to the switching bridge and by means of which a setpoint speed for the DC motor can be specified.

BACKGROUND

The present invention also relates to a method for determining the actual speed of a brushless DC motor of an electric drive unit, the drive unit being equipped with a brushless DC motor and with a switching bridge for sensor-controlled commutation of the DC motor by means of at least one Hall sensor included in the DC motor, the Hall sensor being connected to the switching bridge and set up to detect an angle of rotation of the DC motor, and the drive unit also having a control unit, which is connected to the switching bridge and by means of which a setpoint speed for the DC motor can be specified.

Drive units of the type mentioned at the beginning are known in principle from the prior art and are used for example in electric hand-held power tools, for example cordless screwdrivers, rotary hammers, or combination hammers. Brushless DC motors are typically referred to as BLDC motors and are commutated by means of a switching bridge. As part of the sensor-controlled commutation, this is performed by using at least one Hall sensor, the signal of which controls the switching bridge.

SUMMARY OF THE INVENTION

It is an object of the present invention to specify a drive unit that provides a basis for precise speed control of the brushless DC motor.

With regard to the drive unit, the present invention provides that the control unit is set up to process Hall interrupts that are dependent on the angle of rotation and are caused by the at least one Hall sensor, and to determine an actual speed of the DC motor on the basis of time interrupts that are independent of the angle of rotation and the Hall interrupts that are dependent on the angle of rotation. In a particularly preferred refinement, the DC motor is designed as a 3-phase DC motor with 3 Hall sensors.

The invention includes the knowledge that a precise determination of the actual speed of DC motors, in particular with reference to electric hand-held power tools, has not yet been satisfactorily achieved in the prior art. The electric drive unit according to the invention creates a basis for such a precise determination of the actual speed, in particular at low speeds of the DC motor.

In a further particularly preferred refinement, the control unit is designed to count how many of the Hall interrupts occur in a clock period that is defined by two successive time interrupts. It has proven to be advantageous if the determined actual speed of the DC motor corresponds to the quotient of counted Hall interrupts, which represent the angle of rotation, and the clock period.

In a further particularly preferred refinement, the control unit is designed to determine in each case an offset period between that Hall interrupt which immediately follows a time interrupt in terms of time and this time interrupt. Alternatively, the control unit can be designed to determine in each case an offset period between that Hall interrupt which immediately precedes a time interrupt in terms of time and this time interrupt.

In a particularly preferred refinement, the control unit is designed to correct the timing of the clock period by the offset period. It has proven to be advantageous if the control unit is designed to additionally correct the clock period by the respectively preceding offset period. A corrected clock period may be referred to as a reference period. It has proven to be advantageous if the offset period and/or the preceding offset period can be stored in the control unit and/or can be read out from the control unit.

In a further particularly preferred refinement, the control unit is designed to set the determined speed of the DC motor as a quotient of a constant motor-specific sector angle and the offset period if the respective clock period is free of a Hall interrupt.

It has proven to be advantageous if the time interrupt has a constant clock frequency. In a particularly preferred refinement, the clock frequency of the time interrupt is between 0.5 kHz and 1.5 kHz. It has proven to be advantageous if the clock frequency of the time interrupt is 1 kHz, i.e. that a time interrupt is generated in the control unit every millisecond.

It has also proven to be advantageous if the control unit is designed to first measure and/or correct the offset period and then to process the Hall interrupts that are dependent on the angle of rotation. In a further particularly preferred refinement, it is provided that all interrupts are deactivated during a memory reading process, for example for reading out an offset period and/or a preceding offset period from the control unit.

In a further particularly preferred refinement, it is provided that a Hall interrupt that occurs is given a higher priority than the memory reading process. It has proven to be advantageous if a Hall interrupt that occurs interrupts the memory reading process. In a further particularly preferred refinement, the control unit is designed to measure and/or compensate for a delay which arises as a result of a Hall interrupt which interrupts the memory reading process. In a further particularly preferred refinement, the control unit is designed to detect any unconsidered switching operation in the switching bridge by means of a memory register assigned to the Hall interrupts and, if necessary, to repeat and/or compensate for a determination of the offset period.

In a further particularly preferred embodiment, the control unit is designed for block commutation of the DC motor. The control unit may be provided as an integrated chip, for example as an ASIC or the like. It has proven to be advantageous if the drive unit is provided as a cordless screwdriver, hammer drill or combination hammer.

With regard to the method, the object is achieved in that the actual speed of the DC motor is determined on the basis of time interrupts that are independent of the angle of rotation and Hall interrupts that are dependent on the angle of rotation, the control unit being set up to process the Hall interrupts that are dependent on the angle of rotation and are caused by the at least one Hall sensor. The method according to the invention can be developed in a corresponding manner by the feature described with reference to the drive unit, and vice versa. If, for example, it is described with regard to the drive unit that the control unit is designed to correct the timing of the clock period by the offset period, a corresponding method feature is correcting the clock period by the offset period by means of the control unit.

Further advantages will become apparent from the following description of the figures. Various exemplary embodiments of the present invention are illustrated in the figures. The figures, the description and the claims contain numerous features in combination. A person skilled in the art will expediently also consider the features individually and combine them to form useful further combinations.

BRIEF DESCRIPTION OF THE DRAWINGS

Identical and similar components are denoted by the same reference signs in the figures, in which.

DETAILED DESCRIPTION

Figure 1:
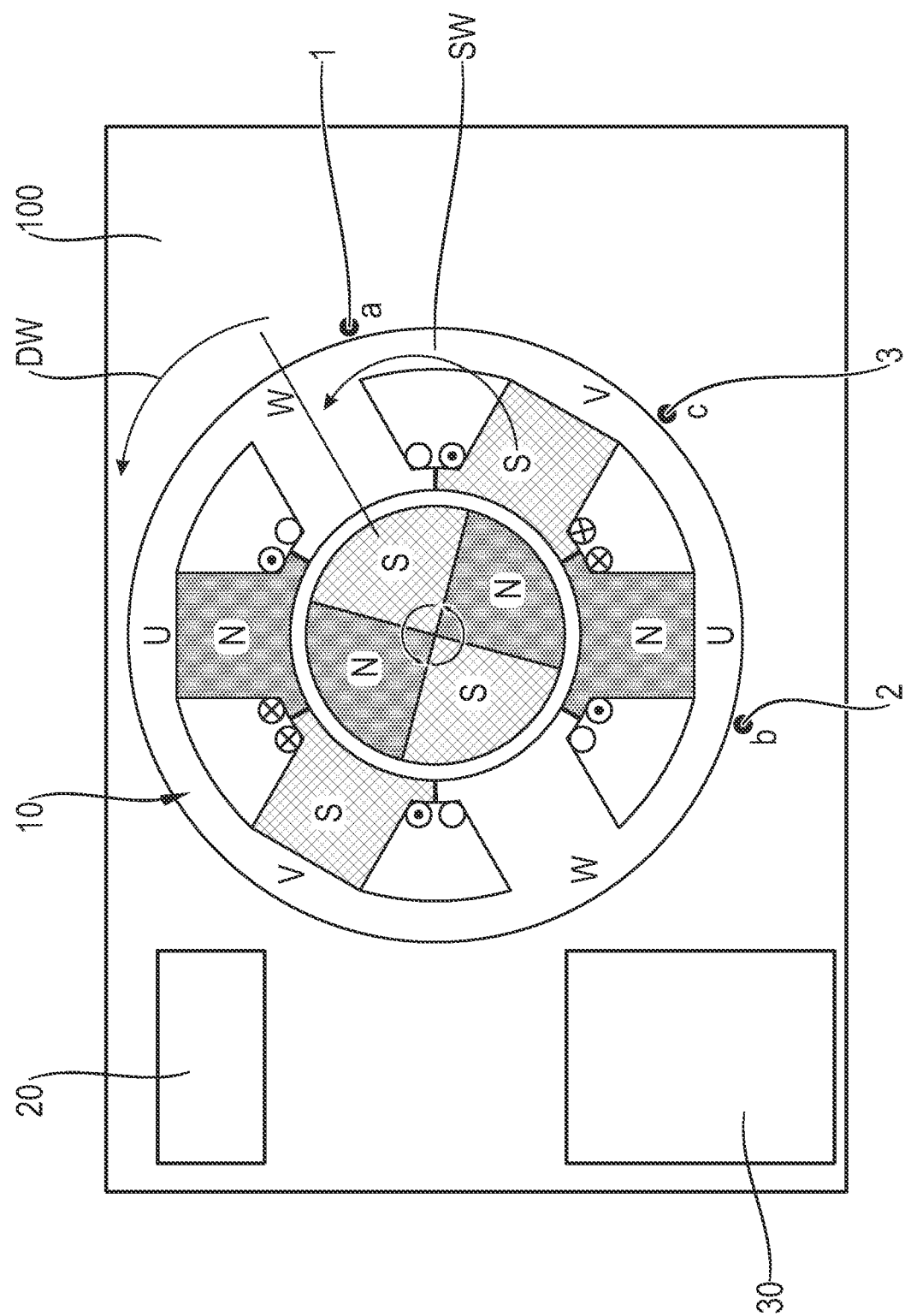
FIG. 1 shows a preferred exemplary embodiment of an electric drive unit.

FIG. 1 shows, in a highly schematic form, a preferred exemplary embodiment of an electric drive unit 100 according to the invention. The drive unit 100 is equipped with a brushless DC motor 10, in the present case in the form of a 3-phase DC motor with 3 pairs of motor poles and three Hall sensors 1, 2, 3. The DC motor 10 has a constant motor-specific sector angle SW (angle between adjacent stator elements) of 60 degrees. The drive unit 100 is also equipped with a switching bridge 20 for sensor-controlled commutation of the DC motor 10. The switching bridge 20 is electrically connected to the Hall sensors 1, 2, 3, as a result of which the DC motor 10 can be commutated in dependence on the angle of rotation DW. During a full revolution of the DC motor 10 by an angle of rotation DW of 360 degrees (a mechanical rotation), two electrical cycles are run through, in which the six switches of the switching bridge 20, not shown here, switch six times, i.e. there is a change in the switching state in the switching bridge 20 for every 30 degrees of mechanical rotation. For every 60 degrees of mechanical rotation, one of the Hall sensors 1, 2, 3 changes its switching state.

The drive unit 100 is also equipped with a control unit 30, by means of which a setpoint speed for the DC motor 10 can be specified. A typical setpoint speed for an electric drive unit 100 of an electric hand-held power tool, not shown here, is over 5000 rpm in normal operation, in particular over 6000 rpm, particularly preferably over 8000 rpm.

The control unit 30 is set up to process Hall interrupts H1 ... H3 that are dependent on the angle of rotation (cf. FIGS. 2-4) and are caused by the three Hall sensors 1, 2, 3, and to determine an actual speed of the DC motor 10 on the basis of time interrupts Z1 ... Z3 that are independent of the angle of rotation (cf. FIGS. 2-4) and the Hall interrupts H1 ... H3 that are dependent on the angle of rotation.

Figure 2:
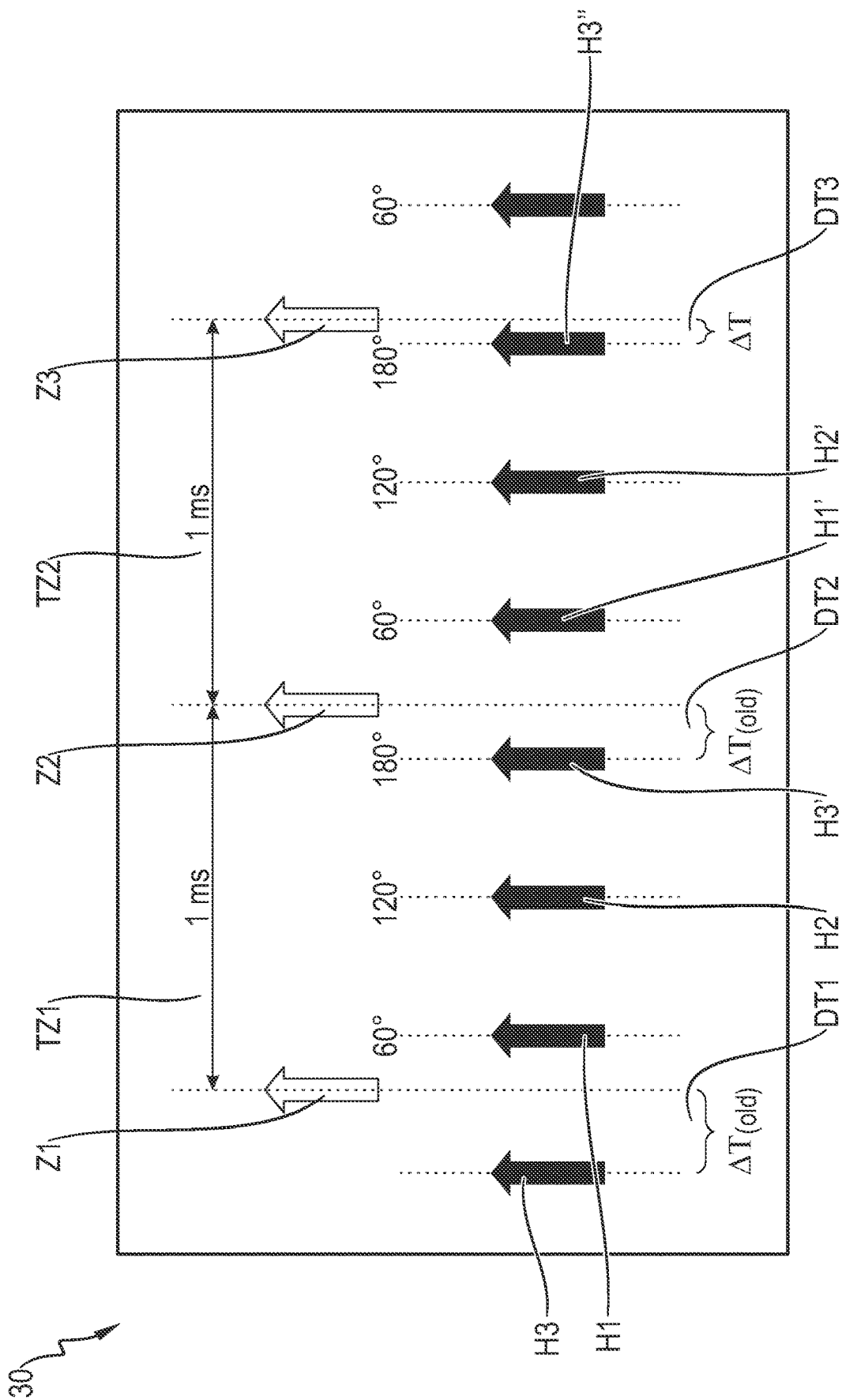
FIG. 2 shows a first diagram which represents the function of the control unit.
Figure 3:
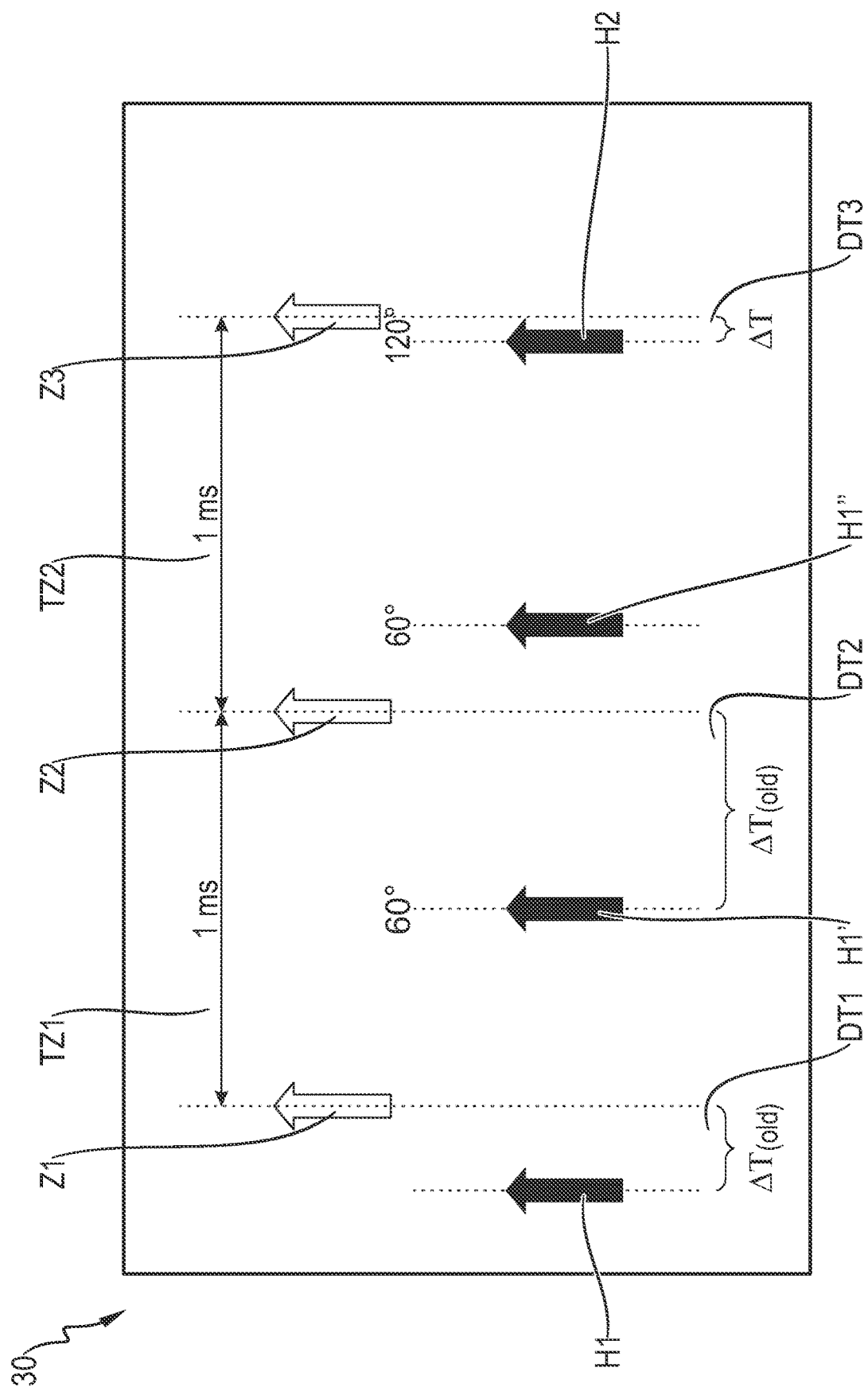
FIG. 3 shows a second diagram which represents the function of the control unit.
Figure 4:
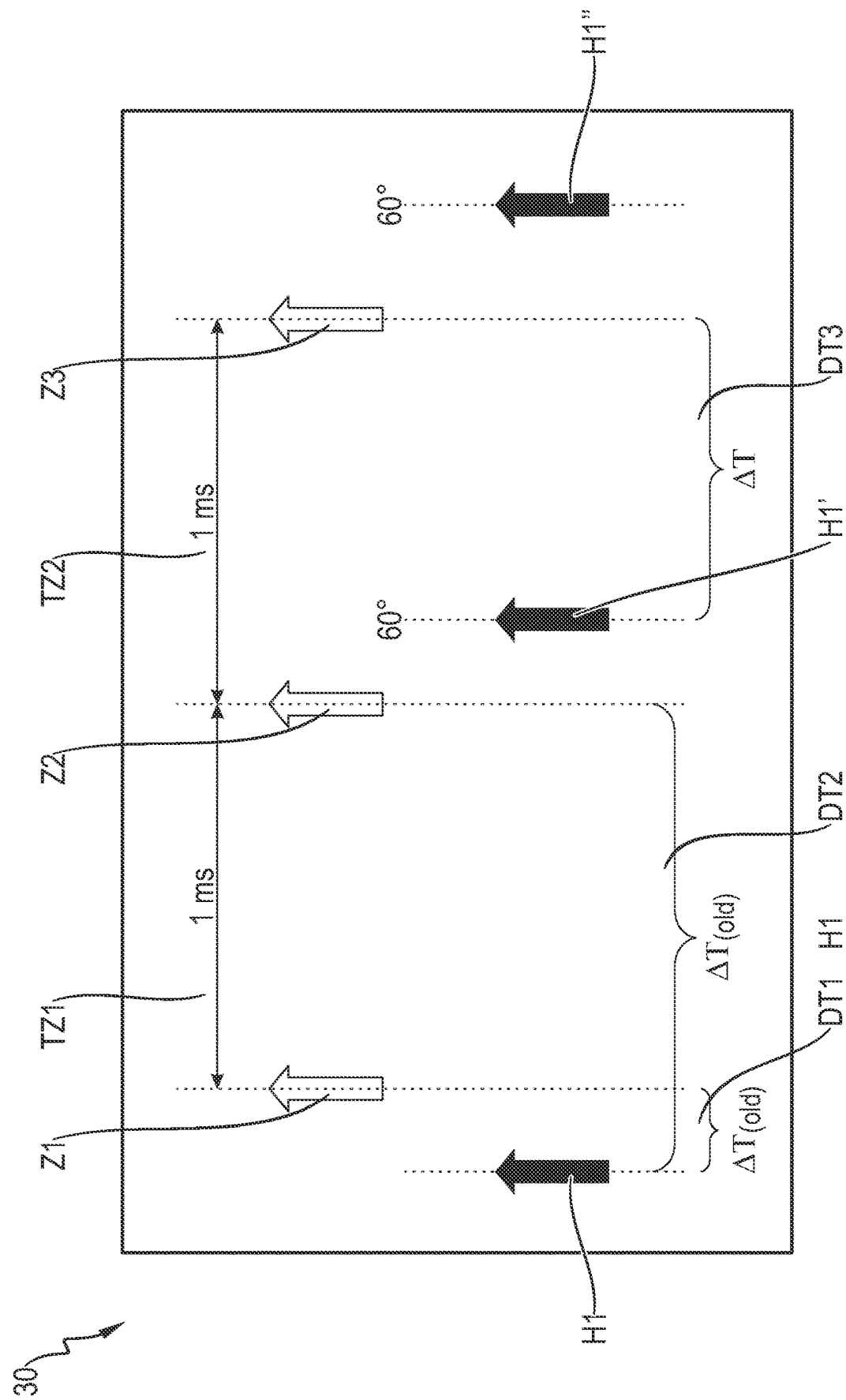
FIG. 4 shows a third diagram which represents the function of the control unit.

This is to be explained by way of example with reference to FIGS. 2-4, each of which shows a diagram explaining the function of the control unit 30 of FIG. 1. FIG. 2 symbolizes here the function of the control unit 30 at an actual speed of the DC motor 10 of well over 5000 rpm, FIG. 3 shows the function of the control unit 30 at an actual speed of the DC motor 10 of about 5000 rpm, and FIG. 4 shows the function of the control unit 30 at an actual speed of the DC motor 10 of well under 5000 rpm. The control unit 30 is set up by way of example to generate the time interrupts Z1 ... Z3 with a constant clock frequency of 1 kHz, i.e. a new time interrupt is generated every millisecond.

The time interrupts Z1 ... Z3 are independent of the angle of rotation, i.e. not dependent on the actual speed and/or the angle of rotation of the DC motor 10. Therefore, in all of FIGS. 2-4 the first clock period TZ1, which is spanned by the second time interrupt Z2 and the first time interrupt Z1, and the second clock period TZ2, spanned by the third time interrupt Z3 and the second time Interrupt Z2, are in each case of the same size.

As already mentioned, FIG. 2 symbolizes the function of the control unit 30 at an actual speed of the DC motor 10 of well over 5000 rpm. The Hall interrupts H1 ... H3 occur with high frequency, since the mechanical rotation of the DC motor 10 in one millisecond is higher than the "electrical rotation" (for every 60 degrees of mechanical rotation, one of the Hall sensors 1, 2, 3 changes its switching state).

The control unit 30 is designed to first count how many Hall interrupts H1 ... H3 occur in a respective clock period TZ1, TZ2. In the example of FIG. 2, these are exactly three Hall interrupts H1 ... H3 in the first clock period TZ1 and exactly three Hall interrupts H1 ... H3 in the second clock period TZ2. The actual speed of the DC motor 10 corresponds here to the quotient of counted Hall interrupts H1 ... H3, which represent the angle of rotation DW, and a respective clock period TZ1, TZ2.

In addition, the control unit 30 is designed to correct the timing of the clock period TZ1 by an offset period DT1. The offset period is the period between that Hall interrupt which immediately follows a time interrupt in time and that time interrupt itself. Accordingly, three offset periods DT1 ... DT3 are determined in the time-based progression of FIG. 2. A first offset period DT1 is spanned between the first time interrupt Z1 and the Hall interrupt H3 immediately following in terms of time, a second offset period DT2 between the second time interrupt Z2 and the Hall interrupt H3' immediately following in terms of time, and a third offset period DT3 between the third time interrupt Z3 and the third Hall interrupt H3" immediately following in terms of time.

The control unit 30 is also designed to additionally correct the clock period by the respectively preceding offset period. In the specific example of FIG. 2, the current third offset period DT3 (i.e. furthest to the right in the diagram of FIG. 2) and the second offset period DT2 preceding it are taken into account for the correction of the current, second clock period TZ2. A current reference period BZ for the clock period TZ2 is calculated by the formula:

$$BZ = TZ2 + DT2 - DT3.$$

The respectively current reference period BZ is thus recalculated in each clock period, with the current (here third) offset period DT3 being stored as the preceding value. In relation to the time-based progression of FIG. 2, the following calculation rule is consequently obtained for the first clock period TZ1, which precedes the second clock period TZ2:

$$BZ = TZ1 + DT1 - DT2.$$

The actual speed DZ of the DC motor 10 can be calculated by the formula:

$$DZ = DW(H1 \ldots H3)/BZ,$$

where DW (H1 ... H3) corresponds to that angle of rotation which is represented by the three Hall interrupts H1 ... H3 in the respective clock period. In relation to the exemplary embodiment of FIG. 1, the three Hall interrupts H1 ... H3 correspond to an angle of rotation DW of 180 degrees (this corresponds to three times the sector angle of the DC motor of 60 degrees).).

FIG. 3 symbolizes the function of the control unit 30 at an actual speed of the DC motor 10 of about 5000 rpm. At this speed, the frequency of the Hall interrupts roughly corresponds to the frequency of the time interrupts. In other words, only one Hall interrupt may occur in a clock period, such as for example the only Hall interrupt H1' in the first clock period TZ1. The calculation rule described with reference to FIG. 2 can also be used.

A first offset period DT1 is spanned between the first time interrupt Z1 and the Hall interrupt H1 immediately following in terms of time, a second offset period DT2 between the second time interrupt Z2 and the Hall interrupt H1' immediately following in terms of time, and a third offset period DT3 between the third time interrupt Z3 and the Hall interrupt H2 immediately following in terms of time. A current reference period BZ for the clock period TZ2 is calculated by the formula:

$$BZ = TZ2 + DT2 - DT3.$$

The respectively current reference period BZ is thus recalculated in each clock period, with the current (here third) offset period DT3 being stored as the preceding value. In relation to the time-based progression of FIG. 3, the following calculation rule is consequently obtained for the first clock period TZ1, which precedes the second clock period TZ2:

$$BZ = TZ1 + DT1 - DT2.$$

The actual speed DZ of the DC motor 10 can be calculated by the formula:

$$DZ = DW(H1 \ldots H2)/BZ,$$

where DW (H1 ... H2) corresponds to that angle of rotation which is represented by the one Hall interrupt H1' in the first clock period TZ1 or by the two Hall interrupts H1", H2 in the clock period TZ2. In relation to the exemplary embodiment of FIG. 1, the Hall interrupt H1' corresponds to an angle of rotation DW of 60 degrees. In relation to the exemplary embodiment in FIG. 1, the Hall interrupts H1", H2 correspond to an angle of rotation DW of 120 degrees (this corresponds to twice the sector angle of the DC motor of 60 degrees).

FIG. 4 symbolizes the function of the control unit 30 at an actual speed of the DC motor 10 of well below 5000 rpm. At this speed, the frequency of the Hall interrupts is significantly lower than the frequency of the time interrupts. In other words, there may not be a Hall interrupt in a clock period, such as for example in the first clock period TZ1. The calculation rule described with reference to FIGS. 2 and 3 can therefore not be used for the first clock period TZ1.

Accordingly, the control unit 30 is advantageously designed to set the determined actual speed of the DC motor as a quotient of a constant motor-specific sector angle SW and the offset period DT1 if the respective clock period (clock period DT1 in FIG. 4) is free of a Hall interrupt.

The actual speed DZ of the DC motor 10 in clock period TZ1 can be calculated by the formula:

$$DZ = SW/DT1.$$

In relation to the exemplary embodiment of FIG. 1, the sector angle SW of the DC motor is 60 degrees.

The actual speed DZ of the DC motor 10 in clock period TZ1 can be calculated by the formula:

$$DZ = DW(H1')/BZ$$

In relation to the exemplary embodiment of FIG. 1, the Hall interrupt H1' corresponds to an angle of rotation DW of 60 degrees. A current reference period BZ for the clock period TZ2 is calculated by the formula:

$$BZ = TZ2 + DT2 - DT3.$$

LIST OF REFERENCE NUMERALS 1, 2, 3 Hall sensor
10 DC motor
20 Switching bridge
30 Control unit
100 Electric drive unit
BZ Reference period
DW Angle of rotation
DT1 ... DT3 Offset period
DZ Actual speed
H1 ... H3 Hall interrupts
SW Sector angle
TZ1, TZ2 Clock period
Z1 ... Z3 Time interrupt

What is claimed is:
1. An electric drive unit comprising:
  a brushless DC motor;
  a switching bridge for sensor-controlled commutation of the DC motor via at least one Hall sensor included in the DC motor, the Hall sensor being connected to the switching bridge and set up to detect an angle of rotation of the DC motor; and
  a control unit connected to the switching bridge, a setpoint speed for the DC motor specifiable via the control unit, the control unit set up to process Hall interrupts dependent on the angle of rotation and caused by the at least one Hall sensor, and to determine an actual speed of the DC motor based on the time interrupts independent of the angle of rotation and on the Hall interrupts dependent on the angle of rotation, the control unit being designed to count how many of the Hall interrupts occur in a clock period defined by two successive time interrupts, the determined actual speed of the DC motor corresponding to the quotient of counted Hall interrupts representing the angle of rotation and the clock period.

2. The drive unit as recited in claim 1 wherein the control unit is designed to determine in each case an offset period between that Hall interrupt immediately following a respective time interrupt in terms of time and the respective time interrupt.

3. The drive unit as recited in claim 2 wherein the control unit is designed to correct the timing of the clock period by the offset period.

4. The drive unit as recited in claim 3 wherein the control unit is designed to correct the clock period additionally by the respectively preceding offset period.

5. The drive unit as recited in claim 2 wherein the control unit is designed to set the determined actual speed of the DC motor as a quotient of a constant motor-specific sector angle and the offset period if the clock period is free of a Hall interrupt.

6. The drive unit as recited in claim 1 wherein the time interrupt has a constant clock frequency.

7. The drive unit as recited in claim 6 wherein the clock frequency is between 0.5 kHz and 1.5 kHz.

8. The drive unit as recited in claim 6 wherein the clock frequency is 1 kHz.

9. The drive unit as recited in claim 1 wherein the switching bridge is designed for block commutation of the DC motor.

10. The drive unit as recited in claim 1 wherein the drive unit is part of an electric hand-held power tool.

11. The drive unit as recited in claim 1 wherein the electric hand-held power tool is a cordless screwdriver, a hammer drill, or a combination hammer.

12. A method for determining an actual speed of a brushless DC motor of an electric drive unit, the drive unit being equipped with a brushless DC motor and a switching bridge for sensor-controlled commutation of the DC motor via at least one Hall sensor included in the DC motor, the Hall sensor being connected to the switching bridge and set up to detect an angle of rotation of the DC motor, and the drive unit also having a control unit connected to the switching bridge and via which a setpoint speed for the DC motor can be specified, the method comprising:

determining the actual speed of the DC motor on the basis of time interrupts independent of the angle of rotation and on Hall interrupts dependent on the angle of rotation, the control unit being set up to process the Hall interrupts dependent on the angle of rotation and caused by the at least one Hall sensor, the control unit being designed to count how many of the Hall interrupts occur in a clock period defined by two successive time interrupts, the determined actual speed of the DC motor corresponding to the quotient of counted Hall interrupts representing the angle of rotation and the clock period.

* * * * *